(12) United States Patent  (10) Patent No.: US 8,454,874 B2
Rushlander et al.  (45) Date of Patent: Jun. 4, 2013

(54) METHOD FOR INSERT MOLDING BENDABLE POSITION-RETAINING TUBING

(75) Inventors: Grandin Rushlander, Mantua, OH (US); Richard T. Seman, Newbury, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 132 days.

(21) Appl. No.: 13/032,476

(22) Filed: Feb. 22, 2011

(65) Prior Publication Data

US 2011/0139288 A1  Jun. 16, 2011

Related U.S. Application Data

(63) Continuation of application No. 11/379,450, filed on Apr. 20, 2006, now Pat. No. 7,891,382.

(60) Provisional application No. 60/597,667, filed on Dec. 16, 2005.

(51) Int. Cl.
*B28B 5/00* (2006.01)

(52) U.S. Cl.
USPC .......................... 264/250; 264/261; 264/263

(58) Field of Classification Search
USPC ......................... 264/250, 261, 263
See application file for complete search history.

(56) References Cited

U.S. PATENT DOCUMENTS

| 3,058,493 | A | 10/1962 | Muller |
| 4,194,081 | A | 3/1980 | Medford et al. |
| 4,463,779 | A | 8/1984 | Wink et al. |
| 4,669,508 | A | 6/1987 | Neaves |
| 4,966,741 | A | 10/1990 | Rush et al. |
| 5,233,739 | A | 8/1993 | Holden et al. |
| 5,277,199 | A | 1/1994 | DuBois et al. |
| 5,324,557 | A | 6/1994 | Lupke |
| 5,449,021 | A | 9/1995 | Chikama |
| 5,454,061 | A | 9/1995 | Carlson |
| 5,573,039 | A | 11/1996 | Mang |
| 6,455,117 | B1 | 9/2002 | Margucci |
| 6,568,610 | B1 | 5/2003 | Ericksen |
| 6,604,550 | B2 | 8/2003 | Quigley et al. |
| 6,907,298 | B2 | 6/2005 | Smits et al. |
| 7,614,427 | B2 | 11/2009 | McKane |

FOREIGN PATENT DOCUMENTS

CA  1229313  11/1987

*Primary Examiner* — Joseph Del Sole
*Assistant Examiner* — David N Brown, II
(74) *Attorney, Agent, or Firm* — Hahn Loeser & Parks LLP

(57) ABSTRACT

A hollow conduit and process for manufacturing therefore which includes steps of extruding a first polymer conduit; cutting said conduit to a pre-determined length; inserting said length into a split mold having a cavity defined therein; inserting at least one flexible position retaining means into said mold; injection molding at least one overmolded polymer onto said plastic conduit and at least partially onto said position retaining means to form a position retaining tube, wherein a portion of the length of said position retaining means is completely embedded within said overmolded polymer and a portion of the length is not embedded within said overmolded polymer; and opening said mold and removing said position retaining tube.

14 Claims, 9 Drawing Sheets

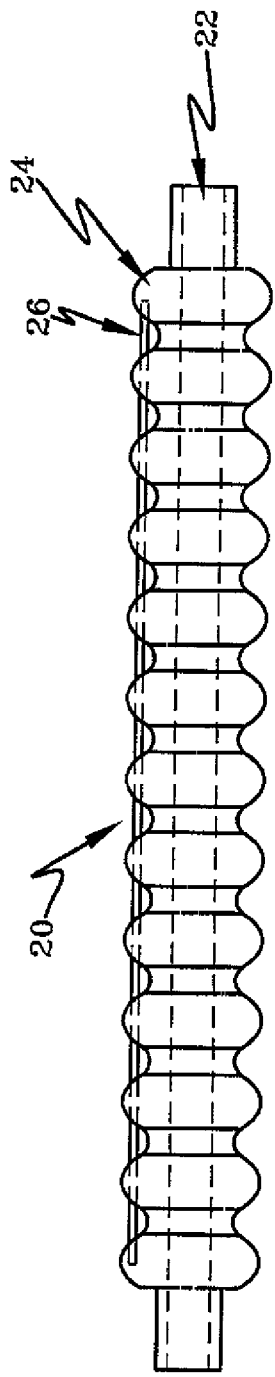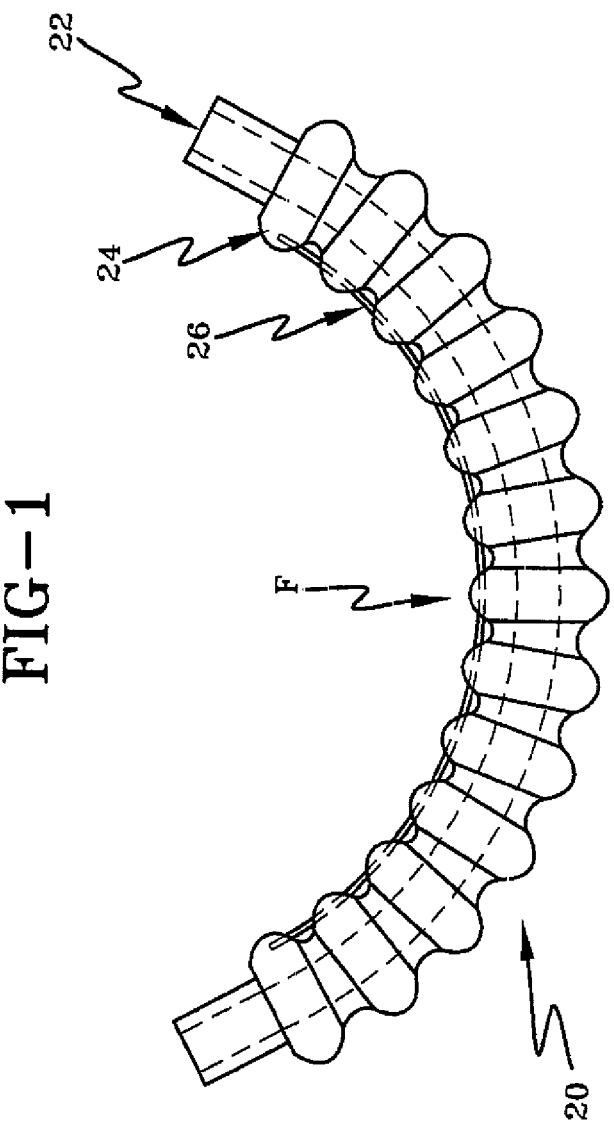
FIG-1
FIG-2

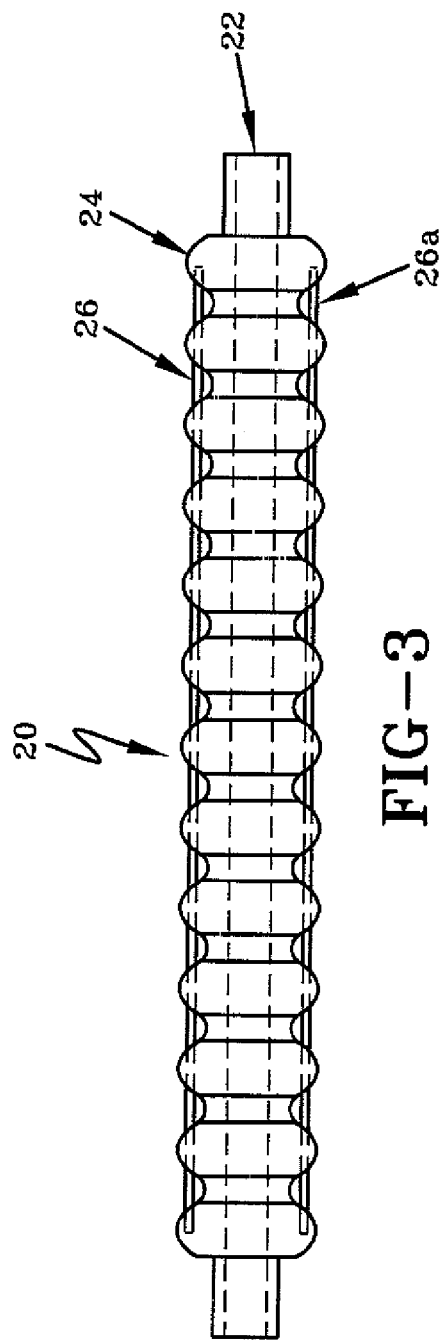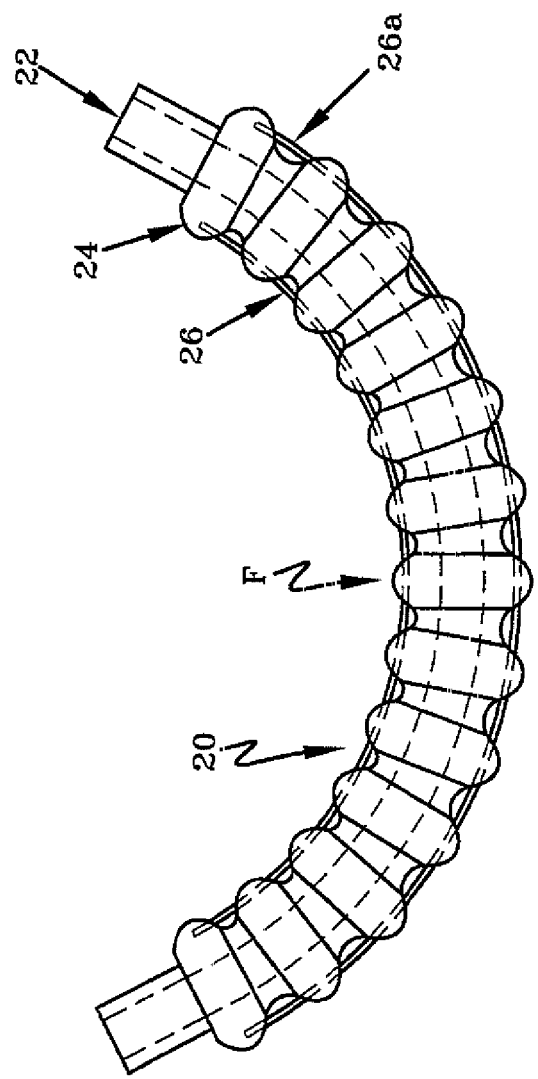

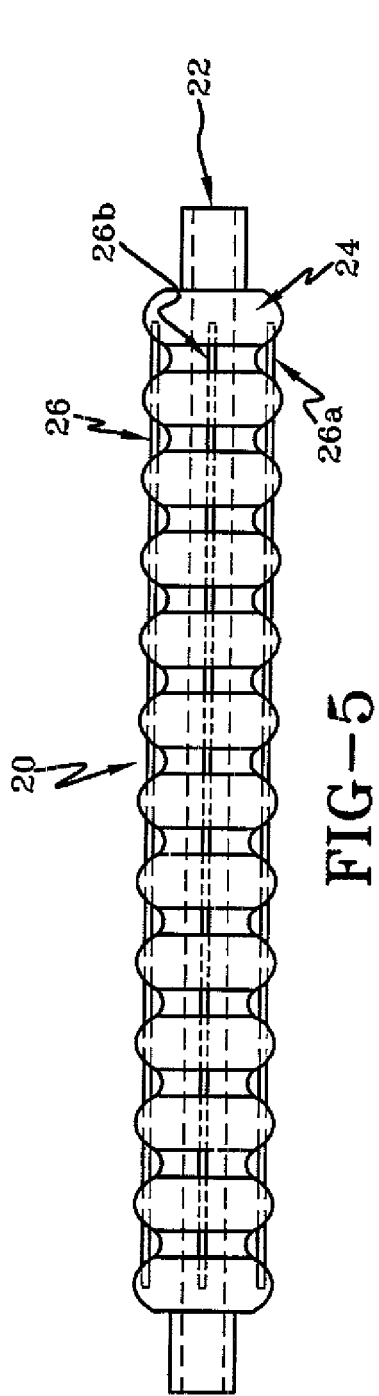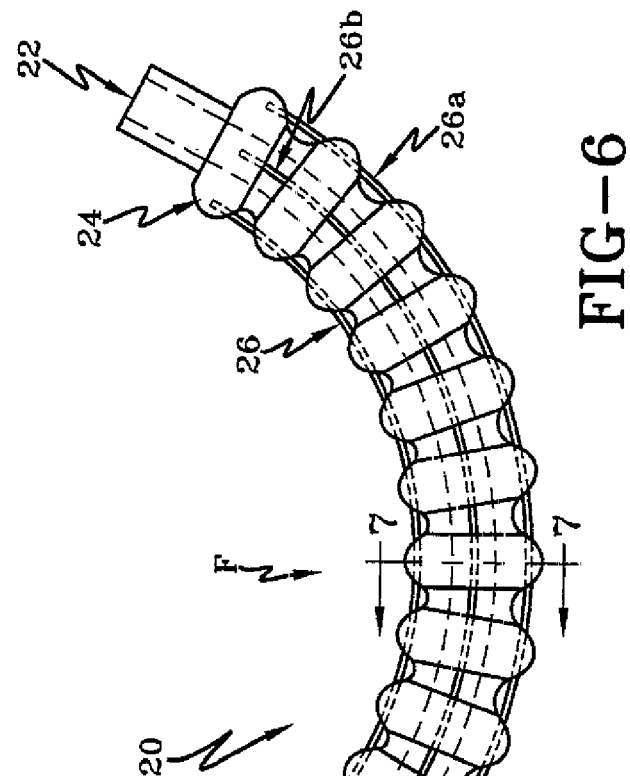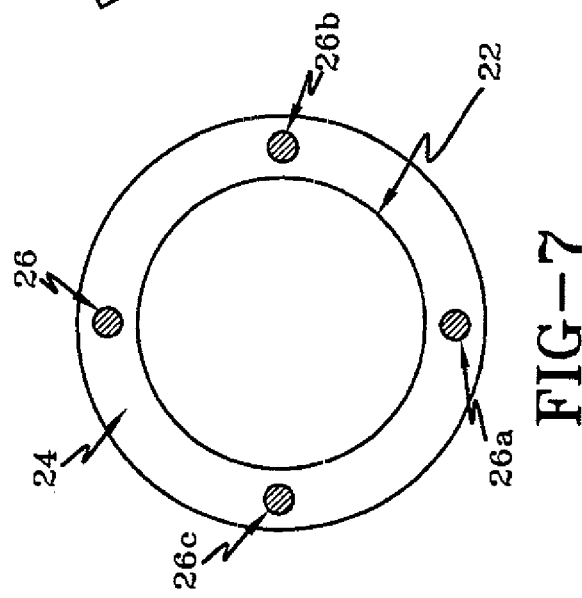

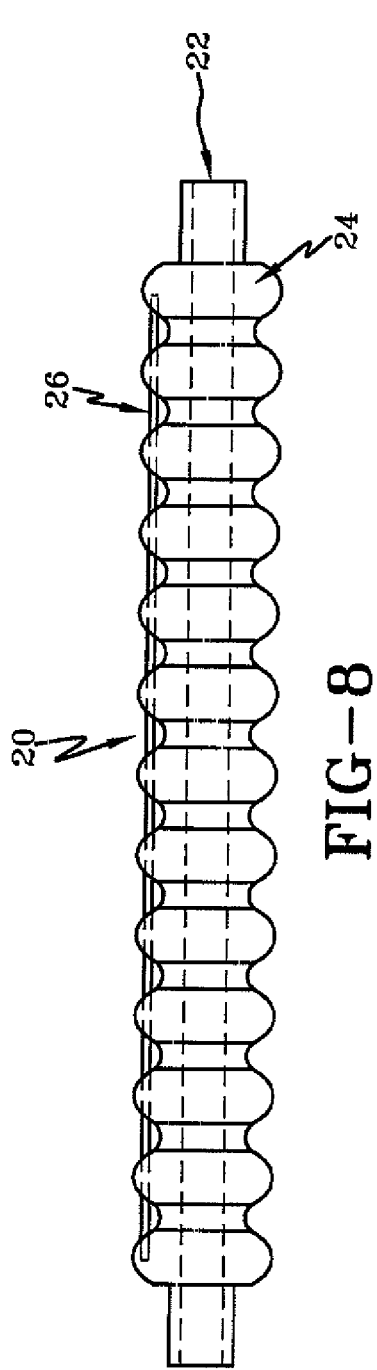
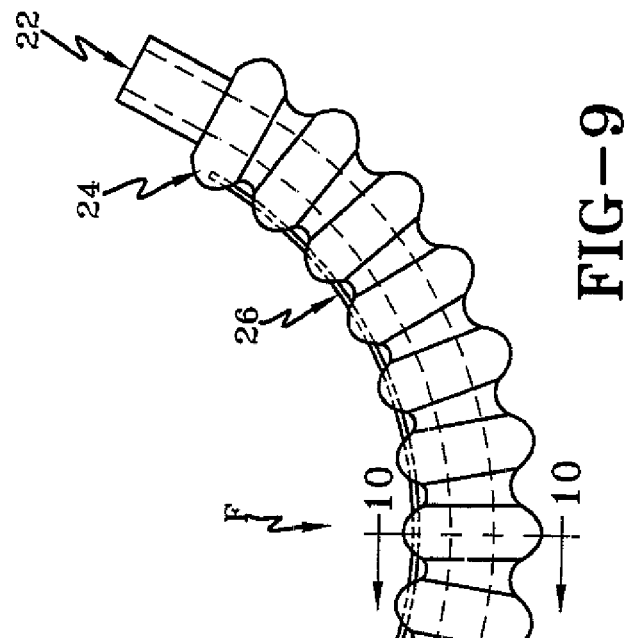
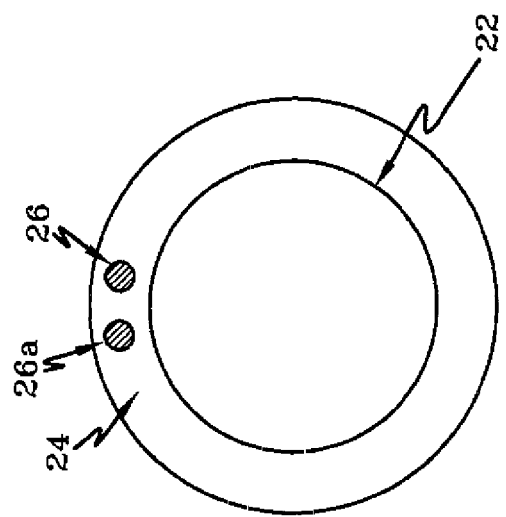

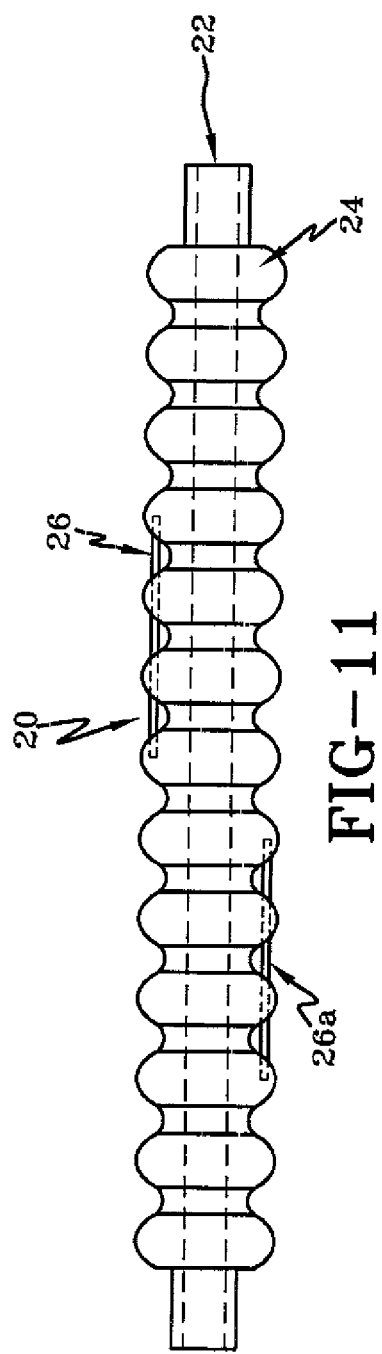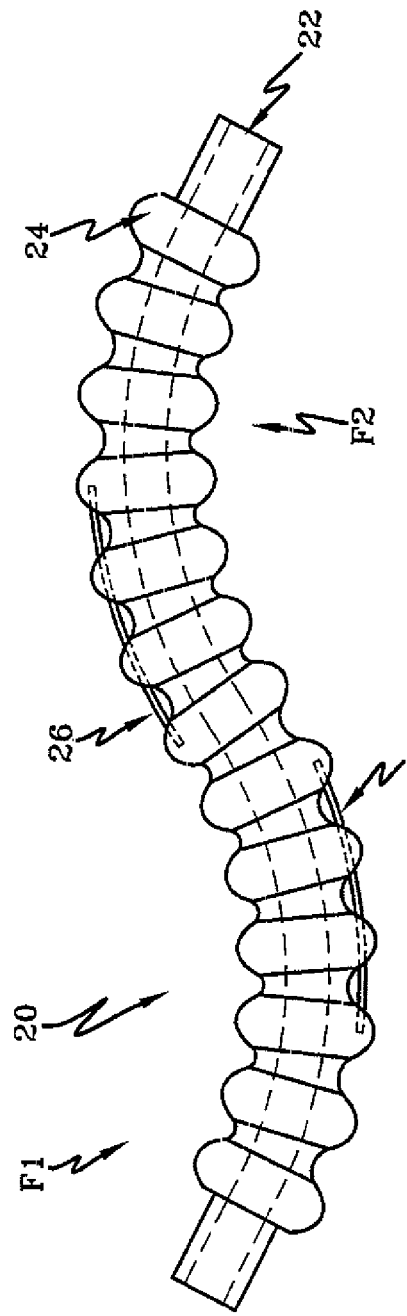
FIG-11
FIG-12

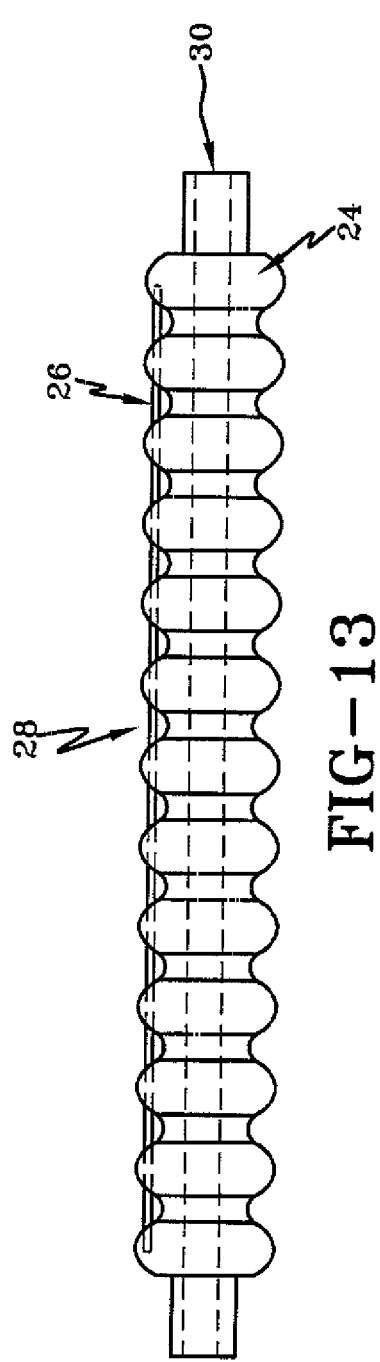
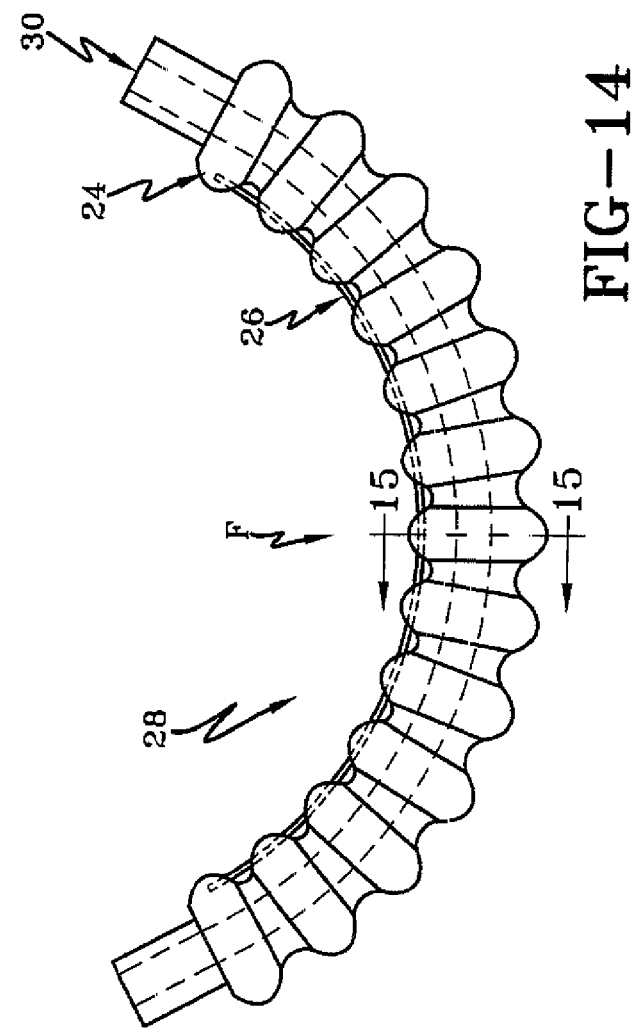
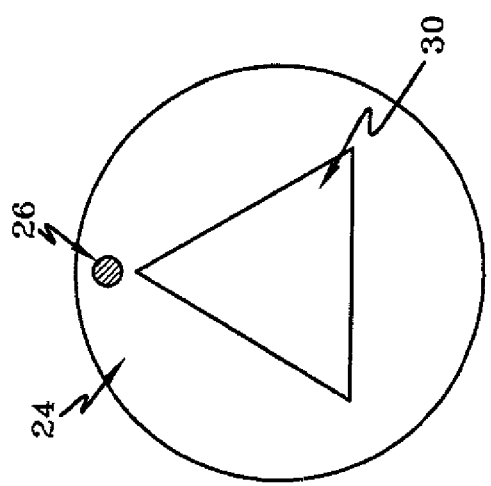

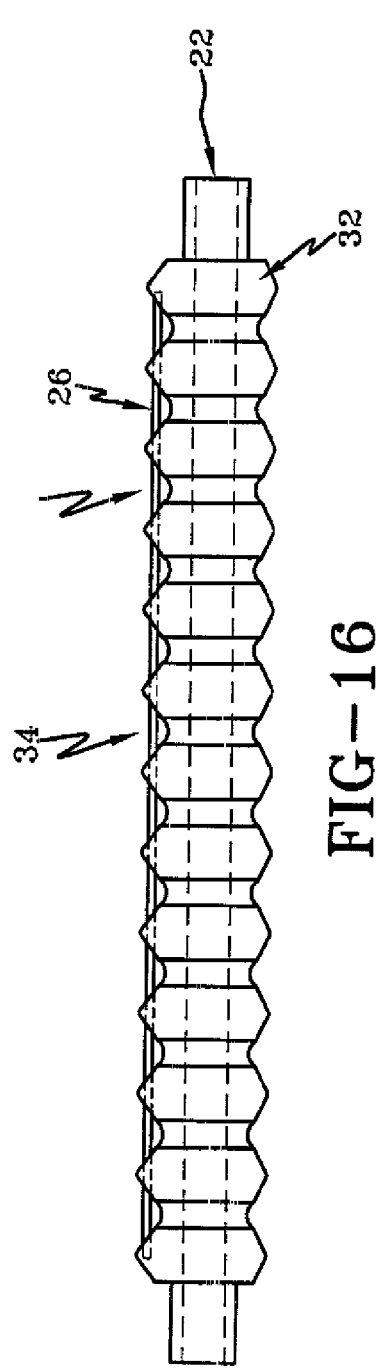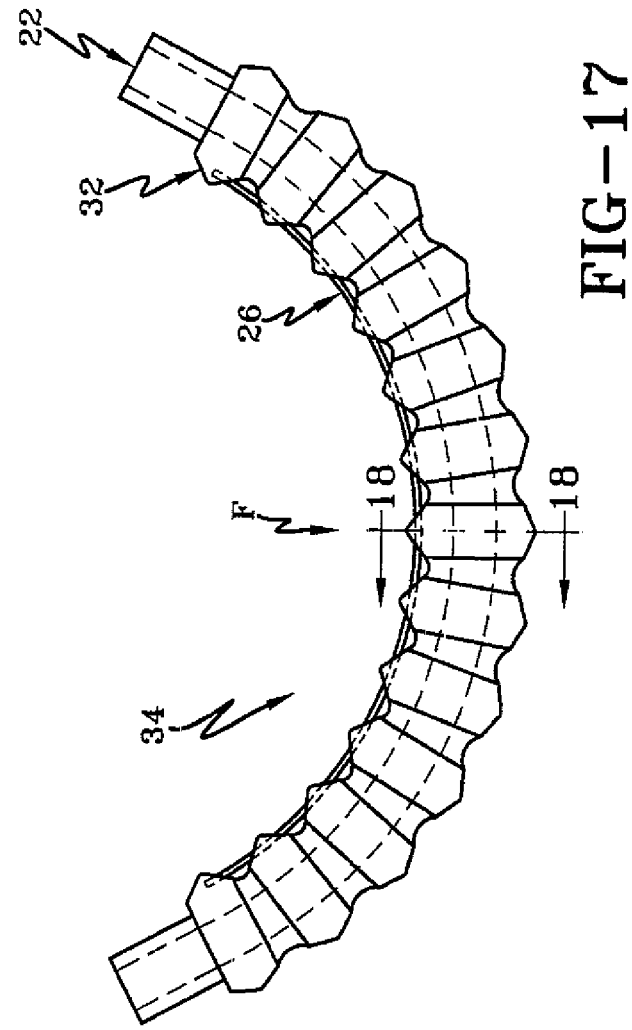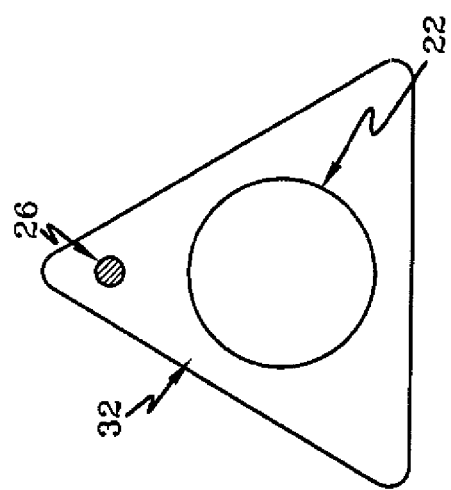

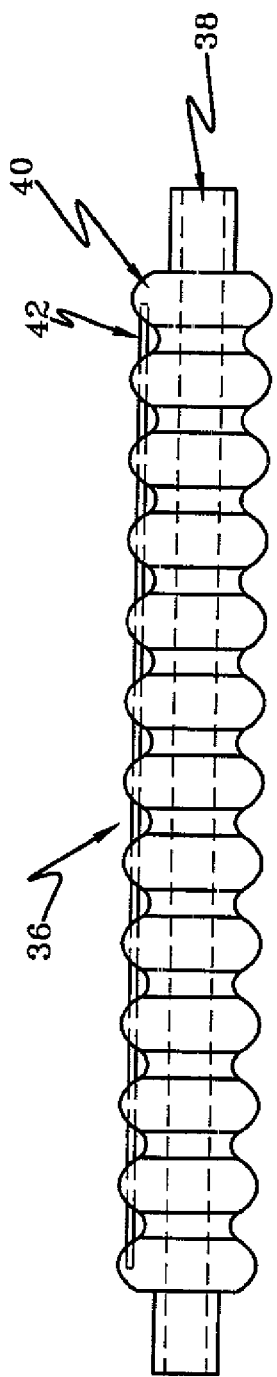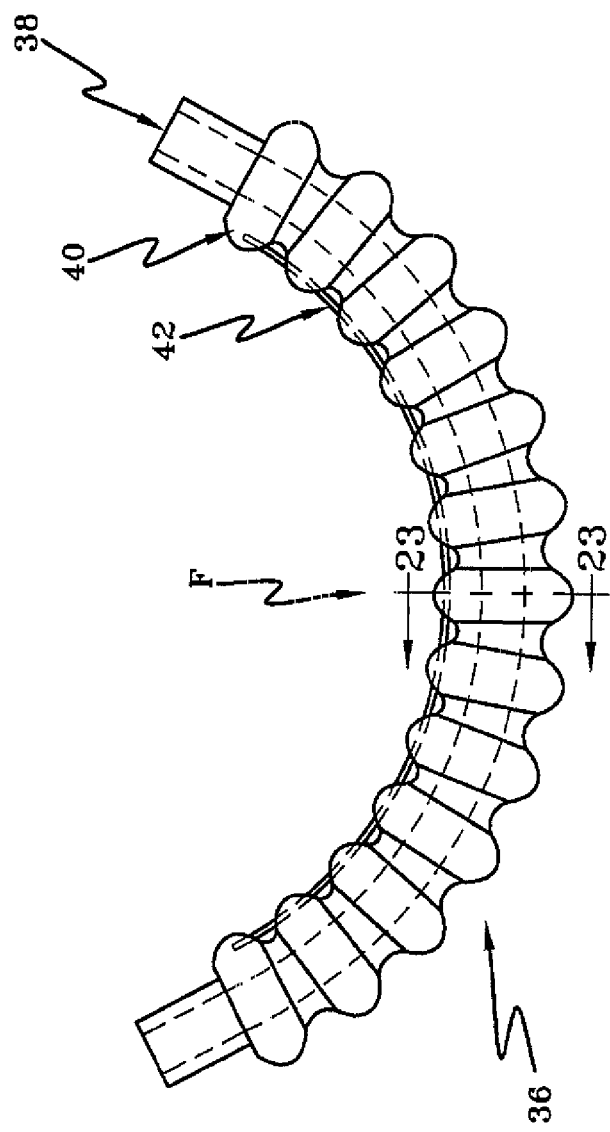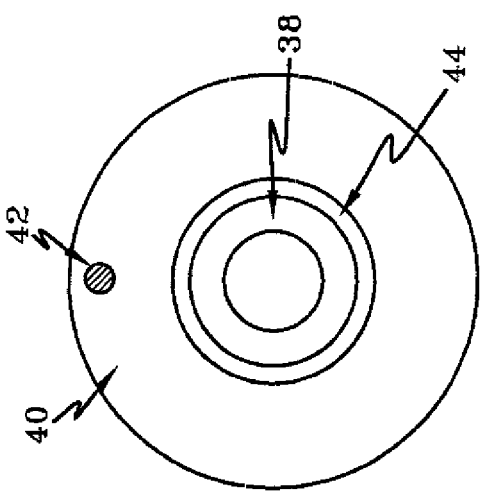

METHOD FOR INSERT MOLDING BENDABLE POSITION-RETAINING TUBING

CROSS-REFERENCE

This application claims priority from U.S. patent application Ser. No. 11/379,450 filed Apr. 20, 2006, which claims priority from U.S. Provisional Patent Application Ser. No. 60/597,667 filed Dec. 16, 2005.

TECHNICAL FIELD

The invention relates generally to bendable position-retaining and/or repositionable yet shape-retaining tubing. In one embodiment of the invention at least one second polymer having at least one position retaining means at least partially embedded therein is molded onto a conduit made of a first polymer. More particularly, the invention relates to the processing of a conduit made of a first polymer, such processing involving injection overmolding of another typically thermoplastic material with flexible wire at least partially embedded therein to form flexible, position-retaining as well as repositionable yet shape retaining tubing.

BACKGROUND OF THE INVENTION

Thermoplastic tubing is used in a variety of applications, such as appliance input and output lines, garden hoses, automobile hoses, medical devices, etc. The tubing is often flexible and able to bend upon the application of an external force. Typically, upon the removal of the external pressure the tubing relaxes to its original position. Attempts have been made to create a tubing product that will retain a predefined shape, see for example U.S. Pat. No. 6,455,117 and Canadian Patent 1,229,313. However, to date no technology has been successful in creating a method to produce flexible tubing material that retains a nonlinear shape without impeding the flow of fluids and gases passing therethrough.

Plastics extrusion processing is defined as converting plastic powder or granules into a continuous uniform melt and forcing this melt through a die which yields a desired shape. This melted material must then be cooled back to its solid state as it is held in the desired shape, so an end product can be realized.

Single screw extruders are the most common in use today. Extruder diameters range from ½" to 12" in a barrel inner diameter. The hopper of an extruder accepts granules or powder which pass through a vertical opening in the feed section where they are introduced to a rotating screw with spiral flights. The material is conveyed along the screw and heated inside the barrel, with the goal being to reach the die system in a totally melt phase at an acceptable and homogeneous temperature, and being pumped at a consistent output rate.

The barrel is heated and cooled by heater/cooler jackets surrounding its outer wall to aid in the melting of the material on the screw. Heater/coolers are electrically heated through heating elements cast into aluminum, with either cooling tubes also cast into the aluminum or deep fins cast on the outer surfaces of the heaters/coolers to allow air cooling of the barrel via blowers. Temperature of the various barrel zones are set according to the material, screw design, and processing goals. These barrel zone temperature settings vary widely, depending on the material used or the product being made while the control of the temperature at the deep barrel thermocouple position for a given situation is typically maintained within a close tolerance range to minimize variations of material exiting the die system. The screw is the heart of the extrusion process and designs for which have varied with time as understanding of the melting process of the plastic material moving along the screw has increased. Since some materials tend to trap air as they start to melt, or contain moisture or volatiles, that will create porosity in the final product, a vent is typically positioned at a point in the barrel to remove the porosity by allowing the escape of gases.

The melt must be shaped and cooled by product sizing and cooling equipment to its solid phase while forming a product that falls within given size tolerances. The dies to create the end products from a melt are varied depending on the shapes involved. Pipe and tubing are cooled through simple, open water troughs, or pulled through vacuum sizing tanks, where the melt is held in a sizing sleeve for a short time in a water filled vacuum chamber. Custom profiles come in various shapes and are commonly made of materials that have high melt viscosity, so they are easy to hold shape while they cool. These products can be cooled by forced air, water troughs, or water spray methods. The methods of getting the many shapes include various sizing fixtures to hold the extrudate as it is pulled through the system and cooled. The material can also be coextruded, i.e., made with more than one material. Coextrusion typically requires a dual-extrusion head and multiple extruders using a specialized die system to bring these layers together with a common sizing and shaping system. Rates of 100 feet per minute are routinely achieved.

To accurately maintain diameter and wall thickness of polymer tubes, a uniform flow rate of melt from the extruder must be guaranteed. All extruders, even those designed for producing extremely tight tolerances will exhibit some surging as a result of electrical drive control fluctuations, screw design, and the normal rheological variation in the polymer. Clearly, higher than commercially acceptable reject rates and waste levels will result if the process relies solely on extruder stability.

Injection molding of thermoplastics is a process by which a polymer is melted and injected into a mold cavity void. The mold used to create the final part is the inverse shape of the desired final product. Molds are typically made of hardened steel or aluminum. Once the melted plastic is injected into the mold, it cools to a shape that reflects the form of the cavity. The result is a finished part needing no other work before assembly into or use as a finished part.

The injection molding machine has two basic components: an injection unit to melt and transfer the plastic into the mold; and a clamp to hold the mold shut against injection pressures and for parts removal. The injection unit melts the plastic before it is injected into the mold. It then injects the melt with controlled pressure and rate into the mold. After the injection cycle, the clamp gently opens the mold halves so the part can be removed from the mold.

Important factors in the processing of plastic for the injection molding process include temperature, consistency, color dispersion and density of the melt. Conductive heat supplied by barrel temperature and mechanical heat generated by screw rotation both contribute to the processing of good quality melt. Often, most of the energy available for melting the plastic is supplied by screw rotation. Mixing happens between screw flights and the screw rotates, smearing the melted surface from the plastic pellet. This mixing/shearing action is repeated as the material moves along the screw until the plastic is completely melted.

When the polymer is a thermoplastic, injection molding uses a screw or a plunger to feed the polymer through a heated barrel to decrease its viscosity, followed by injection into a heated mold. Once the material fills the mold, it is held under pressure while chemical crosslinking occurs to make the polymer hard. The cured part is then ejected from the mold while at the elevated temperature and cannot be reformed or remelted.

When thermoplastics are heated in an injection press, they soften and as pressure is applied, flow from the nozzle of the press into an injection mold at the injection points. The mold has cavities that, when filled with the thermoplastic material, define the molded part. The material enters these cavities through passages cut into the mold, called runners. The mold also has passages in it to circulate a coolant, usually water, through strategic areas to chill the hot plastic. As it cools, the thermoplastic material hardens. When cooled enough, the mold opens and the part is removed.

Injection molding of thermoplastics is increasingly regarded as the preferred method for delivering high quality, value added commercial parts. This process allows for high volume production of complex tightly toleranced three-dimensional parts.

Insert molding is a type of injection molding process. Insert molding builds on the technology of injection molding by placing an insert piece into the cavity of the injection mold before the melted thermoplastic is injected. As the injected melted plastic cools, it typically bonds with the insert piece to create a single object.

In one embodiment the melted plastic can create molecular or mechanical bonds with the insert piece, depending on the material of each. The insert piece can be a thermoplastic or a metal. If the insert material is the same or very similar to the thermoplastic of the injected melted plastic a molecular bond will form between the two. Molecular bonds have strong physical strength, as well as strong leak resistance. If the insert material and injected plastic are substantially different, no molecular bond will occur, but instead a mechanical bond will form by the shrinking of the injected material as it cools or by bonding of the irregularities in the surface of the insert by the injected material.

Standard injection molding presses can be used for insert molding, but special molding machine designs that are better suited for insert molding also exist. Specialized insert molding presses are designed with added features to ease the loading of the insert pieces into the mold, and to hold the insert pieces in place during the injection and hardening of the melted polymer.

The design considerations for insert molding are generally the same as the considerations for other types of injection molding, such as the rate of flow of the melted polymer, and the pressure and temperature of the melted injected polymer. Additional concerns unique to insert molding usually relate to the bonding between the insert piece and injection molding material. Examples of additional concerns are the material of the insert piece, the pull and compression strength requirements, the leak test requirements, and the torque or axial force requirements of the bond between the insert piece and the overmolded second polymer.

SUMMARY OF THE INVENTION

To date there has been no effective processing combination which combines the speed of extrusion with injection molding to fabricate fluid or gas transporting conduits which retain a non-linear shape upon the application of an external force which imparts a bend into the longitudinal axis of the part. In accordance with this invention, there is disclosed a product made by a sequence of processing steps in which a flexible, position-retaining tubing capable of transporting fluid or gases is manufactured which retains its non-linear shape even when the applied force is removed.

The bendable position retaining conduit of the present invention is generally made by combining the two processing methodologies: extrusion and injection molding. In one aspect of the invention extruded profiles are cut to length. The extruded profile can be of any geometric shape or cross section, and in a preferred embodiment are circular or generally circular. The profiles are typically thermoplastics and in a specialized embodiment are either crosslinked or at least partially crosslinked using known crosslinking methodologies, a non-limiting list of crosslinking methodologies including chemical crosslinking and electron beam crosslinking. The extruded profile is subsequently positioned in a mold having a cavity of defined geometry, the cavity including a void for insertion of a position-retaining means, said means preferably being metallic wire of appropriate gauge. Upon closure of the mold (preferably of split mold configuration) a second thermoplastic is injected into the cavity mold containing the metallic wire. The injected polymer has a more rubbery characteristic than the extruded profile polymer.

The Shore durometer, also known as the Rockwell hardness test, is an instrument used to measure hardness of the polymer. There are various Shore scales in use today. The Shore A and Shore D scales are commonly used when referencing hardness of rubbers or synthetics. The Shore "A" scale ranges from 0 to 100 units, wherein the lower the Shore A value of a polymer, the softer the polymer, while the higher the value, the harder the polymer. The Shore "D" scale is generally used to measure harder plastics and polymers. In this invention the extruded profile polymer in the final product will have a higher Shore value than the injection molded polymer. The Shore values for the extruded profile polymer and the injection molded polymer used in the final tubing product may have any value from the Shore A or Shore D scale. In general, the durometer of the overmolded polymer will be the same as or lower than that of the extruded polymer. In one embodiment of the invention the difference in Shore values will be approximately 5%-50% on the same scale, more preferably 5%-25% on the same scale.

It is an object of this invention to illustrate a process which employs insert molding of a second polymer, copolymer, or polymeric blend with at least one position retaining means, preferably a wire which has been at least partially inserted or embedded into the second polymer onto a linear conduit made from a first polymer, preferably by extrusion, to produce a flexible, non-linear position-retaining tubing when bent.

It is another object of this invention to illustrate a process that allows for at least partial insertion of two or more position retaining means, preferably wires, in different locations axially adjacent to the perimeter of the hollow tube, made preferably by extrusion, as well as in different special relationships along the longitudinal axis of the hollow tube to allow the tubing to retain a manually formed position without relaxing to its original essentially linear position when the position forming pressure is removed.

It is a further object of this invention to illustrate a process for the manufacturing of a flexible, non-linear position-retaining tubing that does not impede the flow of liquid or gas through the open volume or void in the center of the tubing.

It is another object of this invention to illustrate a process for the manufacturing of a flexible, non-linear position-retaining tubing that allows the liquid or gas to flow without contact with the typically metallic insert wire that allows the tubing to retain its non-linear shape, minimizing corrosion or degradation of the typically metallic insert as well as preventing contamination of the liquid or gas flowing through the tubing.

It is yet another object of this invention to illustrate a process for the manufacturing of a flexible, position-retaining tubing in which a bond is formed between the fluid or gas carrying inner conduit made of a first polymer and the injection overmolded second polymer wall that the typically metallic wire is at least partially embedded therein.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The invention may take physical form in certain parts and arrangements of parts, numerous embodiments of which will be described in detail in the specification and illustrated in the accompanying drawings which form a part hereof, and wherein:

FIG. 1 is a side view of a tubing product in a linear configuration having one metallic wire position retaining means partially embedded therein;

FIG. 2 is a side view of FIG. 1 in a nonlinear configuration;

FIG. 3 is a side view of another embodiment of a final tubing product in a linear configuration illustrating two partially embedded wire position retaining means;

FIG. 4 is a side view of FIG. 3 in a nonlinear configuration;

FIG. 5 is a side view of another embodiment of a final tubing product in a linear configuration illustrating four partially embedded wires embedded therein, each wire radially spaced about the longitudinal axis of the tubing product;

FIG. 6 is a side view of FIG. 5 in a nonlinear configuration;

FIG. 7 is a cross-sectional view of FIG. 6 on the plane 7-7 illustrating consistent wire spacing;

FIG. 8 is a side view of another embodiment of a final tubing product in a linear configuration illustrating two partially embedded wires embedded therein, unequally spaced about the longitudinal axis of the tubing product;

FIG. 9 is a side view of FIG. 8 in a nonlinear configuration;

FIG. 10 is a cross-sectional view of FIG. 9 on the plane 10-10 illustrating inconsistent wire spacing;

FIG. 11 is a side view of another embodiment of a final tubing product in a linear configuration illustrating two wire position retaining means which only partially extend along the overmolded polymer at non-opposed locations;

FIG. 12 is a side view of FIG. 11 in a nonlinear configuration;

FIG. 13 is a side view of an alternate embodiment of a final tubing product in a linear configuration illustrating a non-circular interior profile of the extruded part;

FIG. 14 is a side view of FIG. 13 in a nonlinear configuration;

FIG. 15 is a cross-sectional view of FIG. 14 on the plane 15-15;

FIG. 16 is a side view of an alternate embodiment of a final tubing product in a linear configuration illustrating a non-circular overmolded polymer;

FIG. 17 is a side view of FIG. 16 in a nonlinear configuration;

FIG. 18 is a cross-sectional view of FIG. 17 on plane 18-18;

FIG. 21 is a side view of another embodiment of a final tubing product in a linear configuration illustrating a mechanical bond between the interior extruded profile and an overmolded plastic sleeve;

FIG. 22 is a side view of FIG. 21 in a nonlinear configuration; and

FIG. 23 is a cross-sectional view of FIG. 22 on plane 23-23.

DETAILED DESCRIPTION OF THE INVENTION

Figure 19:
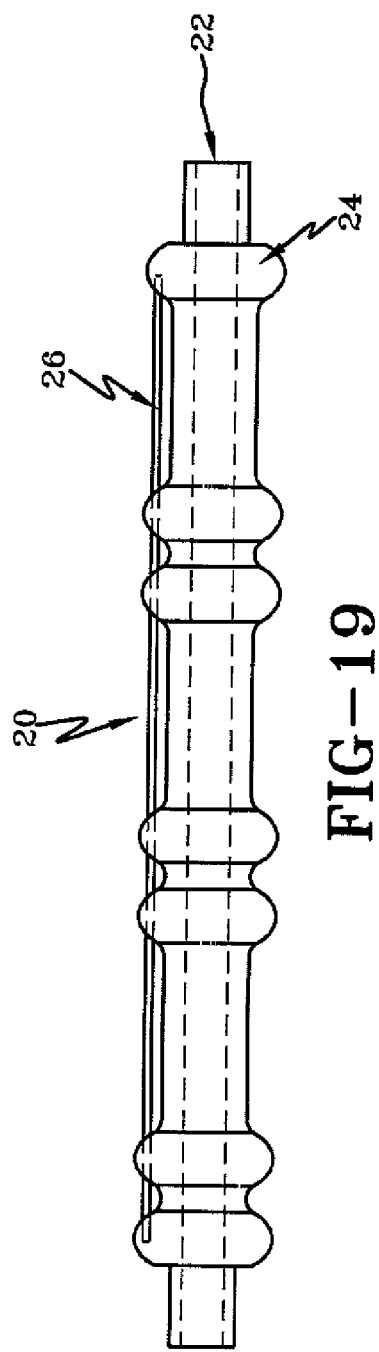
FIG. 19 is a side view of yet another embodiment of a final tubing product in a linear configuration illustrating inconsistent corrugation patterns of the overmolded polymer along the length of the tubing product.

Referring now to the drawings wherein the showings are for purposes of illustrating numerous embodiments of the invention only and not for purposes of limiting the same, the figures show tubing that is bendable and able to retain a manually induced position.

FIGS. 1-2 illustrate an embodiment of the invention. FIG. 1 illustrates the tubing 20 in its original, essentially linear, position before an external bending force has been applied. The inner essentially linear and cylindrical conduit 22 made of the first polymer, preferably by extrusion, is attached to the overmolded second polymer 24 which creates the corrugated external wall of the final tubing product 20. While the external wall illustrated in FIG. 1 is corrugated, the invention is not limited to that geometry. Other shapes and textures are within the scope of the invention or its equivalents. Flexible wire 26 is at least partially embedded or inserted into the second overmolded injected polymer 24, giving the final tubing product the physical characteristics that allow it to retain a non-linear shape without returning to its original position shown by FIG. 1 after the external pressure is removed. The flexible wire 26 is at least partially embedded in the exterior overmolded second polymer 24 through a mechanical bond since the wire 26 will typically be comprised of a metallic material and the overmolding material 24 will be a polymer. Leak resistance of the connection between the wire 26 and the overmolded second polymer 24 is not essential because the gas or liquid running through the final tubing product 20 will be confined to inner conduit 22 made of the first polymer, and therefore will not have contact with the mechanical bonds between the wire 26 and the exterior overmolded second polymer 24.

FIG. 2 illustrates the tubing 20 shown in FIG. 1 after an external manual force F has changed its position to a nonlinear form. After the removal of the outside force, the tubing retains the new position and does not relax back to its original position without a new and separate force again changing its position due to the incorporation of position retaining means 26 at least partially embedded in the tubing 20. The tubing has the ability to retain the nonlinear position due to the position retaining means (preferably flexible wire 26) that is at least partially embedded in the overmolded second polymer 24.

FIGS. 3-4 illustrate another embodiment of the invention. FIG. 3 illustrates the tubing 20 in its original linear position before any external force has been applied to change its position. This embodiment of the invention has a quantity of two (2) flexible wires 26 and 26a bonded by mechanical bonds and embedded at least partially within the exterior overmolded second polymer 24 which surrounds the inner extruded conduit 22. In the figure, the flexible wires 26 and 26a are positioned approximately 180 degrees apart from one another radially within the second overmolded polymer 24. It is not intended by the positioning of the wires in this figure to imply that the wires cannot be spaced in a different configuration or at different locations around the perimeter of the tubing. The insertion of additional flexible wires 26 and 26a into the overmolded second polymer 24 will increase the strength of the final tubing product 20 to hold a nonlinear position, without relaxing back to its original linear position. Adding additional flexible wires to the injected polymer increases the final tubing product's strength against inadvertent external forces such as, but not limited to, vibration or air flow that may otherwise act to change the position of the tubing from its desired and predetermined non-linear position.

FIG. 4 illustrates the tubing 20 shown in FIG. 3 after an external manual force F has changed its position. The additional inserted flexible wire 26a will increase the final tubing product's 20 strength to maintain the position brought on by the external force after the release of that force, and decrease the possibility that inadvertent forces will change the position of the tubing.

FIGS. 5-7 show yet another embodiment of the invention. FIG. 5 illustrates the tubing 20 in its original linear position before any external force has been applied. This embodiment of the invention has a quantity of four (4) flexible wires 26, 26a, 26b and 26c (hidden) bonded by mechanical bonds and embedded within the exterior overmolded second polymer 24. The wires 26, 26a, 26b and 26c are shown in the figure to be positioned at approximately 90 degrees apart from one another radially within the second overmolded polymer 24 of the final tubing product 20, however it is acknowledged that the position of the wires 26, 26a, 26b and 26c does not have to be at consistent or equal intervals, nor at any predetermined location around the perimeter of the inner conduit 22 of the tubing 20 inserted within the second overmolded polymer 24. The increase in the quantity of flexible wires 26, 26a, 26b and 26c will, again, increase the tubing's 20 strength against inadvertent repositioning by an unintended external force.

FIG. 6 illustrates the tubing 20 shown in FIG. 5 after an external manual force F has changed the position of the tubing. The strength of the tube 20 to resist unintended external forces is increased by having four embedded flexible wires 26 as opposed to the fewer flexible wires in the previously shown embodiments.

FIG. 7 shows a cross section of FIG. 6 taken along the plane shown in FIG. 6 as PLANE 7-7. The four (4) flexible wires 26, 26a, 26b and 26c are shown embedded and equally spaced within the overmolded second polymer 24 that was injected onto the cylindrical inner conduit 22 made of the first polymer.

FIGS. 8-10 illustrate another embodiment of the invention. FIG. 8 illustrates the tubing 20 in its original linear position before any external force has been applied to change its position. This embodiment of the invention has a quantity of two (2) flexible wires 26 and 26a bonded by mechanical bonds and embedded at least partially within the exterior overmolded second polymer 24. In the figure, the flexible wires 26 and 26a (hidden) are positioned near one another radially within the second overmolded polymer 24. It is not intended by the positioning of the wires in this figure to imply that the wires cannot be spaced in a different configuration or at different locations around the perimeter of the tubing.

FIG. 9 illustrates the tubing 20 shown in FIG. 8 after an external manual force F has changed its position. The additional inserted flexible wire 26a will increase the final tubing product's 20 strength to maintain the position brought on by the external force after the release of that force, and decrease the possibility that inadvertent forces will change the position of the tubing.

FIG. 10 shows a cross section of FIG. 9 taken along the plane shown in FIG. 9 as PLANE 10-10. The two (2) flexible wires 26 and 26a are shown embedded and unequally spaced within the overmolded second polymer 24 that was injected onto the cylindrical inner conduit 22 made of the first polymer.

FIG. 11-12 demonstrate a further embodiment of the invention. FIG. 11 shows the tubing 20 in its original linear position before any external bending force has been applied to the tubing. Two pieces of flexible wire 26 and 26a are positioned approximately 180 degrees apart from one another radially within the overmolded injected second polymer 24. The flexible wires are also spatially separated along the longitudinal axis of the tubing 20. This configuration of the wires 26 and 26a in the overmolded second polymer 24 allow for more than one bend direction to be created in the tube's 20 positioning, allowing for more flexibility in the positioning of the tube.

FIG. 12 shows the tubing 20 shown in FIG. 11 after external manual forces F1 and F2 have been applied to the tube, changing its position to a nonlinear form. External forces in opposite directions F1 and F2 create opposing directional bends in the tubing 20 creating an S-like shape. The addition of spatially separate flexible wires 26 and 26a embedded in the overmolded second polymer 24 allow for many new possibilities in the positioning of the tubing.

FIG. 13-15 illustrate yet another embodiment of the invention. FIG. 13 shows the tubing 28 in its original linear position before any outside forces have been applied to the tubing, changed its shape to a nonlinear form. The overmolded second polymer 24 is injected over the linear, triangular shaped inner conduit made of the first polymer 30. A flexible wire 26 is embedded in the injected thermoplastic 24 to give the final tubing product the physical characteristics to enable it to hold a position brought on by an external force after the external force has been removed.

FIG. 14 shows the tubing 28 shown in FIG. 13 after an external manual force F has been applied to the tube, changing its position to a nonlinear form. As shown in previous embodiments, many variations of quantities and positions of the flexible wires can alter the form-sustaining properties of the tubing.

FIG. 15 shows a cross sectional view of FIG. 14 along the marked PLANE 15-15. The cross sectional view shows the triangular shaped inner conduit 30 made of the first polymer surrounded by the overmolded second polymer 24 with the flexible wire 26 embedded in that overmolded second polymer 24. Though this embodiment illustrates a triangular shaped inner conduit 30, it is acknowledged that the inner conduit's shape is not limited to a cylindrical or triangular shape, and can be any shape that allows for a hollow cavity through the length of the tubing product and does not impede the flow of liquid or gas through the inner conduit.

FIG. 16-18 illustrate yet another embodiment of the invention. FIG. 16 shows the tubing 34 in its original linear position before any outside forces have been applied to the tubing, changed its shape to a nonlinear form. The overmolded second polymer 32 is injected into a corrugated triangular shaped mold over the linear inner conduit made of the first polymer 22. A flexible wire 26 is embedded in the injected thermoplastic 32 to give the final tubing product 34 the physical characteristics to enable it to hold a position brought on by an external force after the external force has been removed.

FIG. 17 shows the tubing 34 shown in FIG. 16 after an external manual force F has been applied to the tube, changing its position to a nonlinear form. As shown in previous embodiments, many variations of quantities and positions of the flexible wires can alter the form-sustaining properties of the tubing.

FIG. 18 shows a cross sectional view of FIG. 17 along the marked PLANE 18-18. The cross sectional view shows the inner conduit made of the first polymer 22 surrounded by the triangular shaped overmolded second polymer 32 with the flexible wire 26 embedded in that overmolded second polymer 32. Though this embodiment illustrates a triangular shaped overmolded second polymer 32, it is acknowledged that neither the inner conduit's shape or the overmolded second polymer's shape are limited to a cylindrical or triangular shape, and can be any shape that allows for a hollow cavity through the length of the tubing product and does not impede the flow of liquid or gas through the inner conduit.

To create the bendable, position-retaining tubing, the flexible wire(s) are positioned in the desired axial position(s) around the perimeter of the inner polymer conduit which is made preferably by extrusion, and are positioned in the desired vertical location(s) along the longitudinal axis of the inner conduit in the void cavity of the mold used for the injection molding of the tubing. The inner conduit made of the first polymer is also positioned inside the mold cavity to create the interior barrier wall of the mold for the injection molding of the second polymer material. In the overmolding process a second plastic is melted and injected into the mold cavity void, defined in this instance as the void volume between the mold core body and the outer wall of the inner conduit. The melted plastic will fill the mold cavity void, surrounding the flexible wire(s). Once the melted plastic is in the mold, it cools to a shape that reflects the form of the cavity and core. For this invention, the mold core body has corrugations on the wall to create peaks and valleys that appear on the exterior walls of the overmolded second polymer of the final tubing product. The distance between and the height of the peaks and valleys of the corrugation can vary, or be consistent throughout the tubing. There is no required height or distance between the peaks and valleys of the corrugation. The resulting part is a finished part needing no other work before assembly into or use as a finished part.

Figure 20:
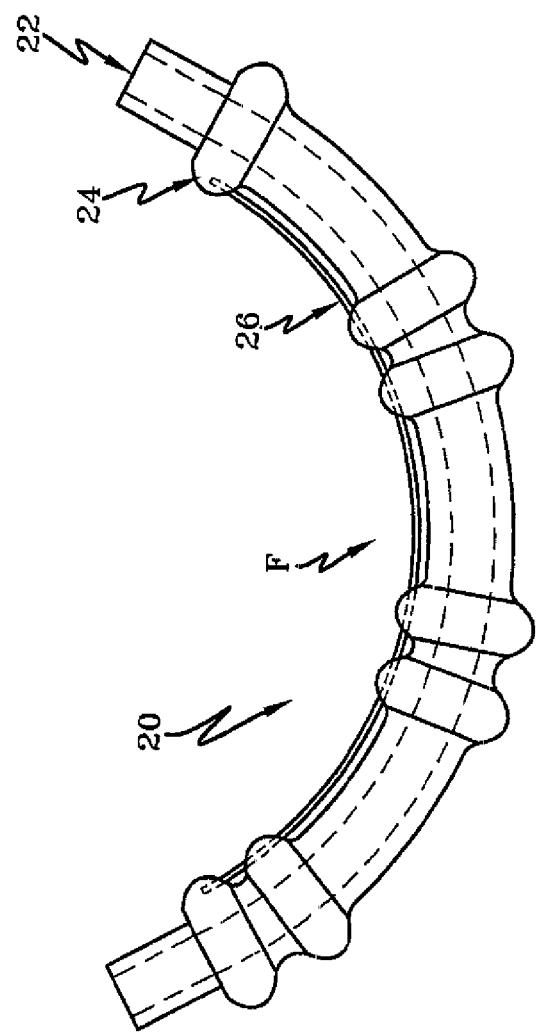
FIG. 20 is a side view of FIG. 19 in a nonlinear configuration.

FIGS. 19-20 illustrate an additional embodiment of the invention. FIG. 19 illustrates the tubing 20 in its original linear position before any outside forces have been applied to the tubing, changed its shape to a nonlinear form. The overmolded second polymer 24 is injected over the linear inner conduit made of the first polymer 22. The overmolded second polymer 24 in this embodiment has an inconsistent corrugation pattern. Sets of peaks and valleys are separated by straight expanses of the overmolded polymer 24 without any corrugations. A flexible wire 26 is embedded in the injected thermoplastic 24 to give the final tubing product the physical characteristics to enable it to hold a position brought on by an external force after the external force has been removed.

FIG. 20 shows the tubing 20 shown in FIG. 19 after an external manual force F has been applied to the tube, changing its position to a nonlinear form. As shown in previous embodiments, many variations of quantities and positions of the flexible wires can alter the form-sustaining properties of the tubing. Many variations of shapes of the interior conduit 22 and the overmolded polymer 24 can also be used.

FIGS. 21-23 show an alternative embodiment of this invention. FIG. 21 illustrates a final tubing product 36 wherein the overmolded second polymer 40 is injection molded with a flexible wire 42 embedded within the overmolded second polymer 40, with no inner conduit 38 in the center using a mandrel to form the inner cylindrical wall of the second, exterior polymer 40. The sheath-like result is then slipped over the inner conduit 38 forming the final tubing product 36.

FIG. 22 shows the final tubing product 36 of FIG. 21 after an external force F has altered the original linear position of the tubing 36 to a non-linear position. When an external force F changes the position of the cover (comprised of the overmolded second polymer 40 and the flexible position retaining means 42) and the inner conduit 38 significantly enough, a mechanical bond would be created, essentially creating a two-part version of the bendable, position-retaining tubing product 36. This embodiment would eliminate the bond between the inner conduit made of the first polymer 38 and the outer sleeve made of the second polymer 40 and position retaining means 42, allowing more combinations of materials for the inner conduit 38 and outer sleeve to be realized. Most thermoplastics and thermosets would be appropriate for use in both the inner conduit and outer sleeve.

FIG. 23 shows a cross sectional view of FIG. 22 along the marked PLANE 23-23. The cross sectional view shows the inner conduit made of the first polymer 38 surrounded by the overmolded second polymer 40 with the flexible wire 42 embedded in that overmolded second polymer 40. Since no chemical bond exists between the inner conduit 38 and the overmolded second polymer 40 a gap 44 exists between the inner conduit 38 and the overmolded second polymer 40. This invention does not intend to limit the distance of the gap between the inner conduit 38 and the overmolded second polymer 40, however the gap that exists must allow a mechanical bond to be created between the inner conduit 38 and the overmolded second polymer 40 when an external force is applied and the position of the tubing product is altered from its original linear form to a new nonlinear position.

One further embodiment of this invention is to utilize extrusion to attach the inner conduit first polymer and the second outer polymer to one another. The extrusion process would yield the same result as the injection molding process by means of running wire through a cross head with the wire between the layers of the material, or embedded in one of the materials. Extrusion would be used to create the inner conduit made of the first polymer which will ultimately create the inner tube wall of the final tubing product. Upon exiting the extruder the inner tube would enter a crosshead die which places continuous lengths of wire from payoff reels, onto the surface of the first tube. A second extruder would then be attached to the crosshead die and utilized to extrude the second polymer material that will become the outer wall of the final tubing product over both the flexible position retaining means and the first inner tube previously extruded. An alternative construction would utilize three material layers, two of which would be the same material used on the exterior of the final tubing product, and extruding the three materials at the same time with the wires embedded between the two identical materials.

The flexible position retaining means embedded in the second, outer polymer can be composed of any material that is flexible enough to achieve the nonlinear position desired for the final tubing product, and has the physical properties allowing the final tubing product to retain a nonlinear position. The materials that can be used to achieve the desired effect of the flexible position retaining means are well-known within the art. Some illustrative and non-limiting examples of appropriate material are copper or aluminum wires, bands, or strips. Other possibilities include metal or non-metal wires, bands, or strips that have the proper physical characteristics to flex and retain the position of the final tubing product.

While the precise composition of the inner conduit comprised of the first polymer and overmolded second polymer are not required to be of any specified polymer, in general, there are several guidelines which are applicable in the practice of this invention. It is, of course, recognized that the precise operating conditions utilized in the overmolding process are well-known in the art and are specific to each injection molded polymer. It is well within the skill of the art to determine the applicable conditions which will result in the appropriate overmolded second polymer and inner plastic conduit. The plastics used for the inner conduit and exterior overmolding plastic must have an adequate flexibility for the purpose in which the final tubing product will be used. The plastic conduit can be a thermoplastic or a thermoset. The overmolded second polymer must be capable of forming either a molecular or mechanical bond with the plastic of the conduit.

At least one embodiment of this invention will utilize an inner extruded tube that is made of an at least partially cross-linked material. The final percentage of cross-linking will be dependent on the final use application of the product. This embodiment will have a preferred cross-linking of at least 25%, more preferably of 50% and most preferably of at least 70-75%. Applications that require an odorless and tasteless means of transporting fluids will require the highest percentage of cross-linking of the material of the inner conduit.

In the practice of this invention, illustrative and non-limiting examples of the polymers which may be used in various combinations to form the plastic conduit as well as polymers which may be used in the overmolding process would include: nylons or polyamides, including various types of nylon-6, nylon-6/6, nylon-6/9, nylon-6/10, nylon-6/12, nylon-11, nylon-12; polyolefin homopolymers and copolymers, including all molecular weight and density ranges and degrees of crosslinking, particularly polyethylene and polypropylene homopolymers and copolymers; and ethylene acid copolymers from the copolymerization of ethylene with acrylic or methacrylic acid or their corresponding acrylate resins. Materials for the overmolded polymer can also include thermoplastic elastomers covering a hardness range of from 30 Shore A to 75 Shore D.

The combination of the above polymers must satisfy certain conditions. The plastic conduit must not soften and begin melt flow to the point where it loses all structural integrity. One of the keys is the recognition that the plastic conduit must be capable of maintaining structural integrity during the overmolding conditions during which the overmolded second polymer is in melt flow. It is recognized however, that due to the presence of a metallic mandrel within the internal diameter of the plastic conduit, this concern is minimized. When using an internally-cooled mandrel, it is possible to heat the mold to a higher temperature than possible if the mandrel is not cooled.

In a preferred embodiment of the invention, the composition of the overmolded second polymer will be such that it will be capable of at least some melt fusion with the composition of the inner polymer conduit, thereby maximizing the leak-proof characteristics of the interface between the inner polymer conduit and overmolded second polymer. There are several means by which this may be effected. One of the simplest procedures is to insure that at least one component of the inner polymer conduit and that of the overmolded second polymer is the same. Alternatively, it would be possible to insure that at least a portion of the polymer composition of the inner conduit made of the first polymer and that of the overmolded second polymer is sufficiently similar or compatible so as to permit the melt fusion or blending or alloying to occur at least in the interfacial region between the exterior of the inner polymer conduit and the interior region of the overmolded second polymer. Another manner in which to state this would be to indicate that at least a portion of the polymer compositions of the plastic conduit and the overmolded second polymer are miscible.

In a preferred embodiment, the flexible position retaining means would have the physical properties such that it would have the appropriate strength to retain a nonlinear position when the final tubing product is manually bent by an external force. The polymer used to create the inner conduit as well as the overmolded second polymer will typically have physical properties such that they will relax back to their original linear position when any external bending force is released. The flexible wire must have adequate strength to withstand the relaxation pressure exerted by the polymer materials upon the release of the external force so the final tubing product will retain the new nonlinear position.

In one specific embodiment of this invention which meets the above criteria, the plastic conduit will be a polypropylene, polyethylene, or nylon material and the overmolded second polymer will be the same or similar polypropylene, polyethylene, or nylon material. The position retaining means will be a metallic wire, preferably selected from the metals aluminum, copper or steel (preferably stainless).

In an alternate embodiment, it is recognized that when the injection overmolded second polymer is capable of shrinkage upon cooling, and the end-use application involves only low pressure, a mechanical shrink-fit may be employed. While in a most preferred embodiment, a molecular bond will occur between the inner conduit made of the first polymer and exterior second polymer overmold, in some applications, where an absolutely leak-proof conduit is not required, or for applications wherein leakage is not an issue, it is possible to forego this type of bond in exchange for a mechanical bond.

It is foreseen and recognized by this invention that different combinations of quantities and positions of the wires allowing the position retention of the tubing can be used. Varying the location of, the distance between, the percentage of insertion of, and the length of the wire(s) along the length of the tubing will allow many alternative retention strengths and ability to position the final tubing product. For example, one embodiment may require two flexible wires down the total longitudinal length of the tubing on opposite sides of the tube, while another embodiment may require four flexible wires on each quarter of the final tubing product down alternating upper and lower longitudinal halves. There is an infinite number of combinations and positions of the flexible wires in the final tubing product. The combination of quantity and position of the flexible wires appropriate for the desired application will depend on the design characteristics of the final tubing product, such as degree of bend desired, strength of bend desired, etc. Typically, the more wires used, the greater length of the wire inserted or embedded, and the closer the wire spacing is the stronger the position retention of the final tubing product will be.

A hollow conduit, being primarily round, or having n sides wherein n is greater than or equal to three is described herein. The hollow conduit is comprised of a polymer inner conduit having a pair of opposed ends and an interior and exterior surface. An overmolded corrugated polymer is bonded between at least a portion of the ends and at least a portion of the exterior surface of the inner conduit. The overmolded polymer has at least one flexible position retaining means at least partially embedded within. The flexible position retaining means within the overmolded polymer may be a metallic wire. The inner conduit may be a thermoset, and the overmolded corrugated plastic may be a thermoplastic.

A process of creating above mentioned hollow conduit comprises of extruding a first polymer conduit, cutting said conduit to a pre-determined length, and inserting the length into a split mold having a cavity defined therein. At least one flexible position retaining means is inserted into said mold, and at least one second polymer is injection molded onto the plastic conduit and at least partially onto the position retaining means to form a position retaining tube. The mold is then opened and the position retaining tube is removed. The flexible position retaining means is a metallic wire. The first polymer conduit may be a thermoset, and the second polymer may be a thermoplastic. The cavity in the mold may be corrugated.

This invention has been described in detail with reference to specific embodiments thereof, including the respective best modes for carrying out each embodiment. It shall be understood that these illustrations are by way of example and not by way of limitation.

What is claimed is:

1. A process which comprises:
   extruding a first polymer conduit;
   cutting said conduit to a pre-determined length;
   inserting said length into a split mold having a cavity defined therein;
   inserting at least one flexible position retaining means at least partially into said mold;
   injection molding at least one overmolded polymer onto said plastic conduit and at least partially onto said position retaining means to form a position retaining tube, wherein a portion of the length of said position retaining means is completely embedded within said overmolded polymer and a portion of the length is not embedded within said overmolded polymer;
   opening said mold and removing said position retaining tube, said at least one flexible position retaining means extending at least partially along a length of said overmolded polymer.

2. The process of claim 1 wherein said flexible position retaining means is a metallic wire.

3. The process of claim 2 wherein said first polymer conduit is a thermoset; and
   said overmolded polymer is a thermoplastic.

4. The process of claim 1 wherein said cavity in said mold is corrugated.

5. The process of claim 1, wherein said flexible position retaining means is completely inserted into said mold.

6. The process in claim 1 wherein said first polymer conduit is n-sided where n is greater than or equal to three.

7. The process in claim 1 wherein said position retaining tube is an n-sided conduit where n is greater than or equal to three.

8. A process which comprises: extruding a first polymer conduit; cutting said conduit to a pre-determined length; inserting at least one flexible position retaining means at least partially into a split mold having a cavity defined therein; injection molding at least one overmolded polymer at least partially onto said position retaining means to form a position retaining tube, wherein a portion of the length of said position retaining means is completely embedded within said overmolded polymer and a portion of the length is not embedded within said overmolded polymer; opening said mold and removing said position retaining tube; and positioning said position retaining tube at least partially around said length of said first polymer conduit, said at least one flexible position retaining means extending at least partially along a length of said overmolded polymer.

9. The process of claim 8 wherein said flexible position retaining means is a metallic wire.

10. The process of claim 9 wherein said first polymer conduit is a thermoset; and said overmolded polymer is a thermoplastic.

11. The process of claim 8 wherein said cavity in said mold is corrugated.

12. The process of claim 8, wherein said flexible position retaining means is completely inserted into said mold.

13. The process in claim 8 wherein said first polymer conduit is n-sided where n is greater than or equal to three.

14. The process in claim 8 wherein said position retaining tube is an n-sided conduit where n is greater than or equal to three.

* * * * *